(12) United States Patent
Gremmert et al.

(10) Patent No.: US 11,315,433 B2
(45) Date of Patent: Apr. 26, 2022

(54) SYSTEMS AND METHODS FOR PROVIDING A TERRAIN AND RUNWAY ALERTING SERVICE OVER A SECURED DATA LINK

(71) Applicant: HONEYWELL INTERNATIONAL INC., Morris Plains, NJ (US)

(72) Inventors: Scott Richard Gremmert, Redmond, WA (US); Kevin Hess, Bothell, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 265 days.

(21) Appl. No.: 16/451,899

(22) Filed: Jun. 25, 2019

(65) Prior Publication Data

US 2020/0410876 A1   Dec. 31, 2020

(51) Int. Cl.
| G08G 5/00 | (2006.01) |
| G08G 5/02 | (2006.01) |
| H04L 9/32 | (2006.01) |
| G01C 21/22 | (2006.01) |
| H04L 29/06 | (2006.01) |

(52) U.S. Cl.
CPC ......... *G08G 5/0086* (2013.01); *G08G 5/0047* (2013.01); *G08G 5/025* (2013.01); *H04L 9/3247* (2013.01)

(58) Field of Classification Search
None
See application file for complete search history.

(56) References Cited

U.S. PATENT DOCUMENTS

| 8,456,328 B2* | 6/2013 | Karthikeyan .......... G01C 23/00 340/945 |
| 9,567,099 B2 | 2/2017 | Poux et al. |
| 10,069,843 B2* | 9/2018 | Yerger .................... H04L 69/08 |
| 2002/0120632 A1 | 8/2002 | Gremmert et al. |
| 2003/0130771 A1 | 7/2003 | Crank |
| 2007/0264953 A1* | 11/2007 | Srinivasan ............ H04L 67/325 455/186.1 |
| 2012/0217317 A1* | 8/2012 | Hake ..................... A01C 21/00 239/1 |
| 2012/0221305 A1 | 8/2012 | Srivastav et al. |

(Continued)

*Primary Examiner* — Aniss Chad
*Assistant Examiner* — Mahmoud M Kazimi
(74) *Attorney, Agent, or Firm* — Lorenz & Kopf, LLP

(57) ABSTRACT

Provided are technologically improved systems and methods for providing terrain and runway feedback for an aircraft over a secured datalink. The method utilizes a controller onboard the aircraft and one on the ground. The controller onboard the aircraft performs the operations of: formatting a data package of mobile platform data; confirming the aircraft has a valid subscription service; securing the data package using a security protocol; and transmitting the data package via a secured datalink. The ground controller performs the operations of: confirming the subscription service of the aircraft; validating the security protocol used on the data package; decoding and processing the data with map extraction, threat detection, and image generation to generate raw terrain and runway feedback data; and transmitting the raw data using the secured datalink. An alert controller is used to generate alert commands for various alert devices based on the raw terrain and runway feedback data.

20 Claims, 3 Drawing Sheets

(56) References Cited

U.S. PATENT DOCUMENTS

| | | | |
|---|---|---|---|
| 2013/0232237 A1* | 9/2013 | Zulch, III | H04L 63/10 709/220 |
| 2016/0291589 A1* | 10/2016 | Ashoori | G01S 1/08 |
| 2018/0315324 A1 | 11/2018 | Singh et al. | |
| 2019/0096271 A1 | 3/2019 | Chandrashekarappa et al. | |
| 2019/0114927 A1* | 4/2019 | McCullough | G08G 5/0091 |

* cited by examiner

SYSTEMS AND METHODS FOR PROVIDING A TERRAIN AND RUNWAY ALERTING SERVICE OVER A SECURED DATA LINK

TECHNICAL FIELD

The technical field generally relates to navigational aids that provide terrain and runway alerting for mobile platforms, and more particularly relates to systems and methods for providing a terrain and runway alerting service for a mobile platform using a secured data link.

BACKGROUND

During operation of a mobile platform, such as an aircraft, a variety of navigational aids are relied upon. One navigational aid provides terrain and runway alerting, which broadly includes the processing of high-resolution map data to determine whether objects or events in the environment around the mobile platform are of concern. The high-resolution map data can comprise a massive amount of data (e.g. 4.3+GB) and is often stored in a database.

The effectiveness of the terrain and runway alerting can be diminished by technological problems related to the use of the high-resolution terrain database. One technological problem is that of distribution. Distributing the high-resolution terrain database, meeting a peak transfer requirement, to all the aircraft worldwide consumes a massive amount of bandwidth, and bandwidth is often expensive and of limited availability. Distribution of updates can occur frequently, often on a 28- or 56-day cycle. Another problem is that the time-to-load the high-resolution terrain database does not fit with a generally targeted 20-minute-turnaround-time that many mobile platform operators strive for. As a result of these distribution and bandwidth problems, may consumers and users of this high-resolution map data struggle to keep their terrain databases updated, often only updating them annually.

In addition to the above-mentioned technological problems, memory capacity on a mobile platform can be expensive. Carrying 4.3+GB of memory capacity on-board every mobile platform can be cost-prohibitive, especially on smaller (less-expensive) aircraft, such as those in the 2-6 seat category. Further, a processing capability sufficient to sort through 4.3+GB of memory can be prohibitively expensive. Further still, the computational demand for processing very-high-resolution map data poses thermal-management difficulties, especially for mobile platforms that do not have forced-air cooling.

Accordingly, systems and methods for terrain and runway alerting that provide improvements over conventional approaches are desirable. Desired systems and methods for terrain and runway alerting address the above-mentioned technological problems and provide a functional result of credibly assisting the pilot in performing the technical task of operating the aircraft. The following disclosure provides technological solutions to these problems, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system for providing terrain and runway feedback for a mobile platform, including: a first controller onboard the mobile platform, the first controller operable to: create a first data package of concurrently collected mobile platform data including state data; format the first data package in accordance with a first communication protocol; secure the first data package using a security protocol; and transmit the secured first data package in accordance with the first communication protocol; and a second controller external to the mobile platform, the second controller operable to: decode the first data package to reveal the concurrently collected data; process the concurrently collected data with map extraction and threat detection, thereby generating terrain and runway feedback data; perform image generation on the terrain and runway feedback data, thereby creating image data; format the image data and terrain and runway feedback data in accordance with a second communication protocol to thereby create a second data package; secure the second data package using the security protocol; and transmit the secured second data package in accordance with the second communication protocol; and an alert controller operable to: receive the secured second data package from the second controller; validate the security protocol used on the secured second data package; decode the second data package to reveal the image data and terrain and runway feedback data; and generate each of: display commands, audio commands, and device commands, responsive to the image data and terrain and runway feedback data.

Also provided is a method for providing terrain and runway feedback for an aircraft, including: at a telemetry controller onboard the aircraft: creating a first data package of concurrently collected mobile platform data including state data; formatting the first data package in accordance with a first communication protocol; confirming the aircraft has a valid subscription service when a subscription management service is activated; securing the first data package using a security protocol; and transmitting the secured first data package in accordance with the first communication protocol; and at a threat and map controller external to the mobile platform: receiving the secured first data package from the aircraft; validating the security protocol used on the secured first data package; decoding the first data package to reveal the concurrently collected data; processing the concurrently collected data with map extraction and threat detection, thereby generating terrain and runway feedback data; performing image generation on the terrain and runway feedback data, thereby creating image data; formatting the image data and terrain and runway feedback data in accordance with a second communication protocol to thereby create a second data package; securing the second data package using the security protocol; and transmitting the secured second data package in accordance with the second communication protocol; and at an alert controller: receiving the secured second data package from the second controller; validating the security protocol used on the secured second data package; decoding the second data package to reveal the image data and terrain and runway feedback data; and generating each of: display commands, audio commands, and device commands, responsive to the image data and terrain and runway feedback data.

In another embodiment, a system is provided for providing terrain and runway feedback for a mobile platform including a display system responsive to display commands and a telemetry controller operable to transmit a secured first data package of concurrently collected mobile platform data including state data, the system including: a threat and map controller external to the mobile platform, the threat and map controller operable to: receive the secured first data package from the mobile platform; validate a security protocol used on the secured first data package; decode the first data package to reveal the concurrently collected data; process the concurrently collected data with map extraction, threat detection, and image generation, thereby creating terrain and runway feedback data; format the terrain and runway feedback data in accordance with a second communication protocol to thereby create a second data package; secure the second data package using the security protocol; and transmit the secured second data package in accordance with the second communication protocol; and an alert controller operable to: receive the secured second data package from the second controller; validate the security protocol used on the secured second data package; decode the second data package to reveal the image data and terrain and runway feedback data; and generate and transmit display commands, responsive to the terrain and runway feedback data.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

Figure 1:
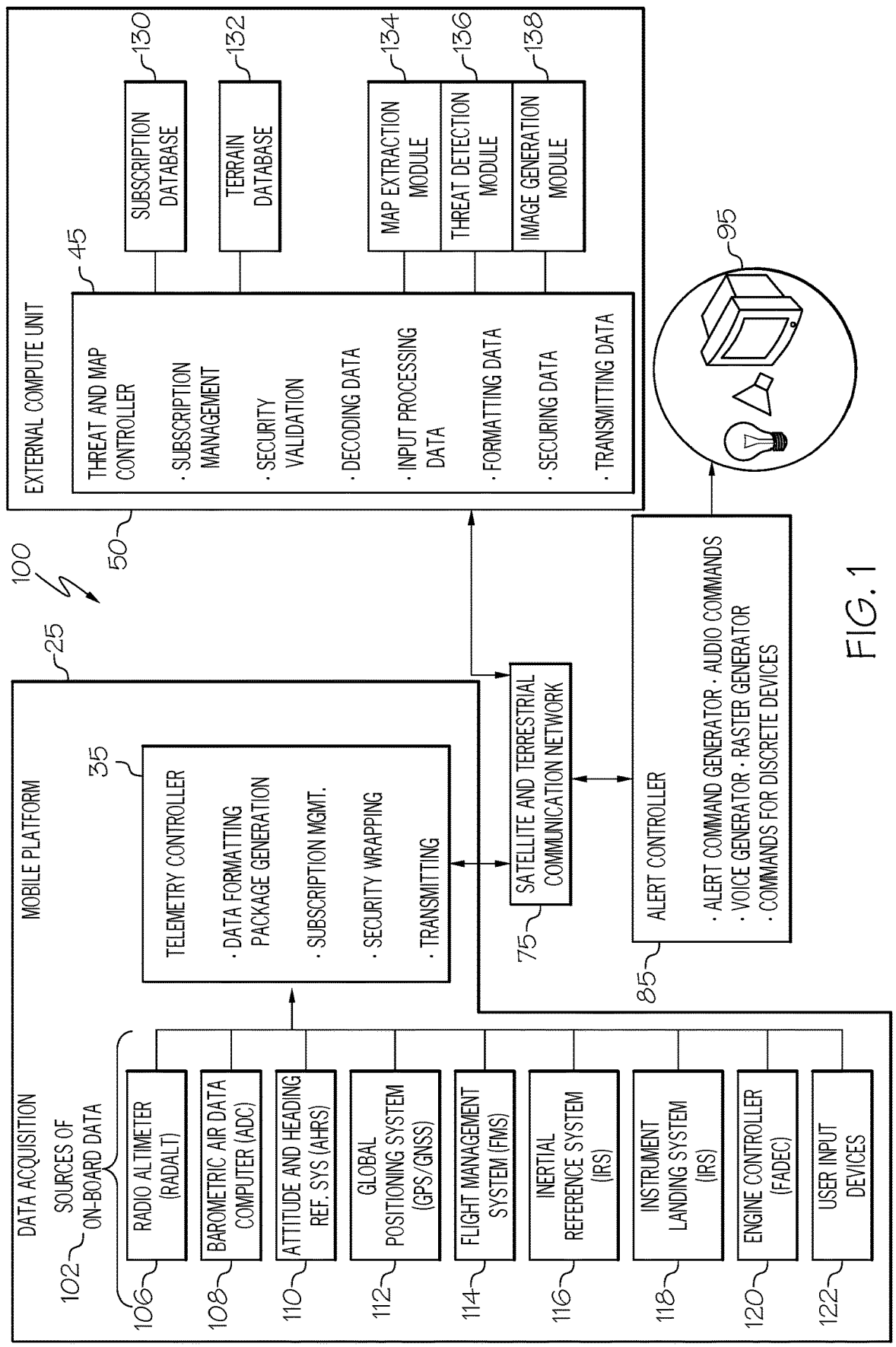
FIG. 1 is a functional block diagram of a system for providing a terrain and runway alerting service for a mobile platform using a secured data link, in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, technological problems related to the storage, distribution, peak transfer requirement, and processing of a high-resolution terrain database hamper conventional approaches to terrain and runway alerting for mobile platforms. The proposed system for providing a terrain and runway alerting service for a mobile platform using a secured data link (FIG. 1, system 100) provides a technical solution to at least these technological problems, for example by lowering the peak transfer requirement to a continuous and background transfer requirement.

The design strategy provided by the proposed system for providing a terrain and runway alerting service for a mobile platform using a secured data link includes, but is not limited to: (1) storing the massive high-resolution terrain database on the ground where it can be updated continuously updated with the latest/best version available to subscribers on the mobile platform/aircraft; this offloads the mobile platform of the requirement for storage of the massive high-resolution terrain database; (2) performing the data processing and image generation based on the terrain data on the ground; this offloads the mobile platform of the hot, expensive computing power; and (3) leveraging existing sources of on-board data for data acquisition. The design strategy provided herein adds only a small telemetry controller, or a telemetry controller and an alert controller to the on-board existing equipage (i.e., hardware and software). This design strategy utilizes a handshake-style security protocol and operates over a secured data link. This design strategy provides many advantages over conventional terrain and runway alerting systems, for example, storing the terrain database off the aircraft protects the terrain database from being subjected to aircraft-related power glitches, lightning, vibration, dirt, and loss-of-cooling, and increases the chances that each aircraft accessing the map data is accessing the best available and most current map data. These design features and many more reduce cost, complexity, and quality assurance procedures for mobile platforms/aircraft. The figures and descriptions below provide more detail.

Turning now to FIG. 1, in an embodiment, the system for providing a terrain and runway alerting service for a mobile platform using a secured data link 100 (also referred to herein as "system" 100) is generally associated with a mobile platform 25, external compute unit 50, and an alert controller 85, each of which are operable to communicate via a satellite and/or terrestrial communication network 75. In various embodiments, the system 100 drives one or more alert devices 95, such as: a display device, a display system, an audio system, a light, a haptic system, or the like.

The alert controller 85 may be co-located with a human or computer that is guiding the mobile platform 25. In some embodiments, the alert controller 85 and alert devices 95 are onboard the mobile platform 25. In other embodiments, such as remotely piloted aircraft, urban air mobility vehicles, unmanned aircraft, and the like, the alert controller 85 and alert devices 95 are external to the mobile platform 25.

In various embodiments, the mobile platform 25 is an aircraft, and is referred to as aircraft 25. A telemetry controller 35 performs the functions and operations of system 100 that take place on-board the aircraft 25. The telemetry controller 35 is in operable communication with a plurality of sources 102 of on-board data that perform data acquisition. Non-limiting examples of sources 102 of on-board data include: a radio altimeter 106, a barometric air data computer (ADC) 108, an attitude and heading reference system (AHRS) 110, a global positioning system (GPS or GNSS) 112, a flight management system (FMS) 114, an inertial reference system (IRS) 116, an instrument landing system (ILS) 118, an engine telemetry controller 35, and user input devices 122 (for receiving and generating discrete pilot or crew input).

Individually, each of the sources 102 of on-board data may generate its respective data using analog, discrete, or digital encoding. The telemetry controller 35 is operable to passively receive and actively collect data from each of the sources 102 of on-board data, and to collect them simultaneously and/or concurrently, meaning, at the same time. This function may be referred to as data acquisition. At any given time, the concurrently collected data from the sources 102 of on-board data is referred to as "mobile platform data." In an embodiment, mobile platform data includes state data (e.g., ground speed, altitude, orientation, location, and direction of movement) of the mobile platform 25. In various embodiments, the mobile platform data may include state data and sensed avionics data (e.g., engine status, fuel status, flap configuration, and the like).

For ease of discussion, at a time, t, a block of concurrently collected mobile platform data is referred to as a data package. The telemetry controller 35 is operable to generate a data package, determine or identify a previously prescribed communication protocol for use, and to format the data package in accordance with the communication protocol. The previously prescribed communication protocol may be supplied by a user, via a user input device, may be programmed into the telemetry controller 35 during an initialization process, or may be communicated to the telemetry controller 35 from an external source.

In various embodiments, the telemetry controller 35 is further operable to perform subscription management when a subscription management service is activated. Performing subscription management includes steps for confirming that the mobile platform 25 has an activated valid subscription service with the external compute unit 50. In embodiments that use the subscription service, the telemetry controller 35 will confirm a valid subscription service before proceeding to securing the data package using a security protocol and transmitting the secured data package (via the satellite and terrestrial communication network 75) to the external compute unit 50.

Regardless of whether the subscription management service is utilized, in various embodiments, the secured data package, once generated, is transmitted using a high-bandwidth, high-reliability, air-ground datalink; this is referred to herein as transmitting it using a secured datalink. These operations are described in more detail in connection with FIGS. 2-3.

The system 100 functions that involve the expensive processing of the mobile platform data with the high-resolution terrain data are performed by the external compute unit 50, which is on the ground, such as at a ground station. The external compute unit 50 may include a threat and map controller 45, an optional subscription database 130, a terrain database 132, a map extraction module 134, a threat detection module 136, and an image generation module 138. The subscription database 130 stores and maintains up-to-date subscription status for multiple mobile platform members. In various embodiments, the threat and map controller 45 is operable to add, update, and remove members of the subscription database 130. In various embodiments, the subscription status includes at least a binary valid/invalid association with each mobile platform member of the multiple mobile platforms in the subscription database 130. As mentioned above, the terrain database 132 is used to store and maintain the massive, high definition, up-to-date, terrain map data. In embodiments using a subscription management service, the threat and map controller 45 is operable to validate a subscription status responsive to a validity inquiry from a mobile platform 25. The threat and map controller 45 is operable to receive data packages transmitted from the mobile platform 25, validate the security protocol used on a received data package, and decode and input process the data encoded within data packages. Input processing decoded data packages, as used herein, includes feeding the data into a virtual model of an aircraft, or appropriate mobile platform model, to subject it to input data validation and filtering, as may be conventionally done in preparation for map extraction and threat detection.

The threat and map controller 45 is further operable to feed the output from input processing into the map extraction module 134, the threat detection module 136 and the image generation module 138, to thereby generate raw data comprising image data, terrain feedback data, and runway feedback data, this raw data is collectively referred to as "terrain and runway feedback data." In various embodiments, instead of processing all available terrain data in the generation of the "terrain and runway feedback data," the threat and map controller 45 identifies and processes into the data package, a block of terrain data that is relevant to the mobile platform, referred to herein as a terrain data patch; the terrain patch may be, for example, a 100-mile area.

In various embodiments, the map extraction module 134, the threat detection module 136, and the image generation module 138, are conventionally available software programs and/or hardware devices that the threat and map controller 45 commands in a conventional manner, to thereby generate the terrain and runway feedback data. In other embodiments, the threat and map controller 45 includes therein the instructions and algorithms to perform the operations provided by the map extraction module 134, the threat detection module 136, and the image generation module 138. Regardless of the partitioning of the tasks within the external compute unit 50, the external compute unit 50 is operable to format and secure the terrain and runway feedback data in accordance with a prescribed communication protocol and transmit the secured terrain and runway feedback data. The threat and map controller 45 transmits the secured data package using a high-bandwidth, high-reliability, air-ground datalink. These operations are described in more detail in connection with FIG. 2.

The alert controller 85 is the system 100 component that processes the output of the external compute unit 50. The alert controller 85 is operable to receive data packages transmitted from the external compute unit 50, validity check the received data package, and remove the digital signing and encryption layers, i.e., decode the mobile data within the data package, thereby revealing the raw data including image data, terrain feedback data, and runway feedback data. The alert controller 85 is operable to generate and transmit alert commands using the raw data. In some embodiments, the raw data may be transmitted directly, to drive low-level driver functions in the alert devices 95 block (e.g., discrete outputs that may feed lamps or other visual indicators in a cockpit). The raw data may also contain either discrete indications of what aural alerts to give, or it may contain the actual audio wave files to play in the alert devices 95 block.

In addition, the alert controller 85 is operable to generate alert commands for alert devices 95 responsive to processing the raw data. In various embodiments, the external compute unit 50 may have access to an Airline Operations Center data, and the threat and map controller 45 may augment or customize wave files to the native language of the operators or pilots of the mobile platform 25. In various embodiments, the threat and map controller 45 varies volume settings in accordance with previously prescribed pilot preferences or in accordance with an ambient noise level (based on sensed engine speed, air speed, rain rate, sampled cockpit audio, etc., that is provided within the data packages).

In various embodiments, the data package transmitted by external compute unit 50 contains a map to be displayed on the navigation displays in the aircraft 25. In various embodiments, the threat and map controller 45 makes a concession to bandwidth limitations and closed-loop response time requirements of the aircraft 25, because the generated raw data contains a map much larger and higher-resolution than the on-aircraft 25 display system can accommodate, and then identifies a portion deemed most relevant to the mobile platform 25 and samples (rasterizes) it to generate alert commands that are display commands for an on-aircraft 25 display system. In exemplary embodiments, the display commands are generated for a display device that is realized on one or more electronic display devices, such as a multi-function display (MFD) or a multi-function control display unit (MCDU), configured as any combination of: a head up display (HUD), an alphanumeric display, a vertical situation display (VSD) and a lateral navigation display (ND).

In summary, the alert commands may include display commands, for a display system to render one or more of text, symbols, graphics (two- and three-dimensional), and animation. The alert commands may include a replete set of signals to cause cockpit data to be communicated to the pilot and crew via graphical displays on a cockpit display system. The alert commands may include audio commands for an audio system to emit words or sounds. And, the alert commands may include device controls. Succinctly, in various embodiments, the alert controller 85 is operable to generate each of: display commands, audio commands, and device commands, responsive to the image data and terrain feedback data and runway feedback data. These operations are described in more detail in connection with FIG. 2.

The satellite and terrestrial communication network 75 is operable to support low latency communications between the telemetry controller 35, the threat and map controller 45, and the alert controller 85. The satellite and/or terrestrial communication network 75 may support very high frequency (VHF), high frequency (HF), or satellite communications (SATCOM). It may also include aeronautical radio, incorporated (ARINC), Societe internationale (SITA) information technology, and internet. As a functional block, the satellite and terrestrial communication network 75 may represent one or more transmitters, receivers, and the supporting communications hardware and software required for components of the system 100 to communicate as described herein.

Exemplary embodiments of the system 100 utilize controllers to perform the functions, operations, and tasks, and to thereby provide a technical solution to the above-mentioned technical problems. In the example depicted in FIG. 1, telemetry controller 35 is located on-board the aircraft 25, threat and map controller 45 is located in the external compute unit, and the alert controller 85, is depicted external to both the mobile platform 25 and the external compute unit 50. In various embodiments, the alert controller 85 is internal to the mobile platform 25, and potentially integrated with telemetry controller 35.

As used herein, the term "controller" refers to any means for facilitating communications and/or interaction between the components of the system 100 and performing additional processes, tasks and/or functions to support operation of the system 100, as described herein. Depending on the embodiment, the controllers may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

With continued reference to FIG. 1, in various embodiments, the telemetry controller 35, threat and map controller 45, and alert controller 85 are each realized as an enhanced computer system, comprising a memory and/or database for storage of a respective set of instructions, algorithm, and/or program, a processor to execute the instructions, and input/output interface (I/O). Information in the memory and/or database may be organized and/or imported from an external source during an initialization step of a process; it may also be programmed via a user input device. Within each controller, the input/output interface (I/O) enables intra-controller communication, as well as communications between the controller and other components in operable communication with the controller. The input/output interface (I/O) may include one or more network interfaces and can be implemented using any suitable method and apparatus. In various embodiments, the input/output interface (I/O) supports communication with technicians, and/or one or more storage interfaces for direct connection to storage apparatuses, such as the subscription database 130 and the terrain database 132.

During operation of the controller, the processor loads and executes one or more algorithms, instructions, and rules embodied as a program, and, as such, controls the general operation of the controller, as described within the system 100. In other embodiments, the controllers (the telemetry controller 35, threat and map controller 45, and alert controller 85) may be implemented differently, using any hardware, software, firmware, electronic control component, processing logic, and/or processor device, individually or in any combination. It is also to be understood that telemetry controller 35 may be implemented differently than threat and map controller 45, and the alert controller 82 may be implemented the same as telemetry controller 35, the same as threat and map controller 45, or differently than telemetry controller 35 and threat and map controller 45.

Figure 2:
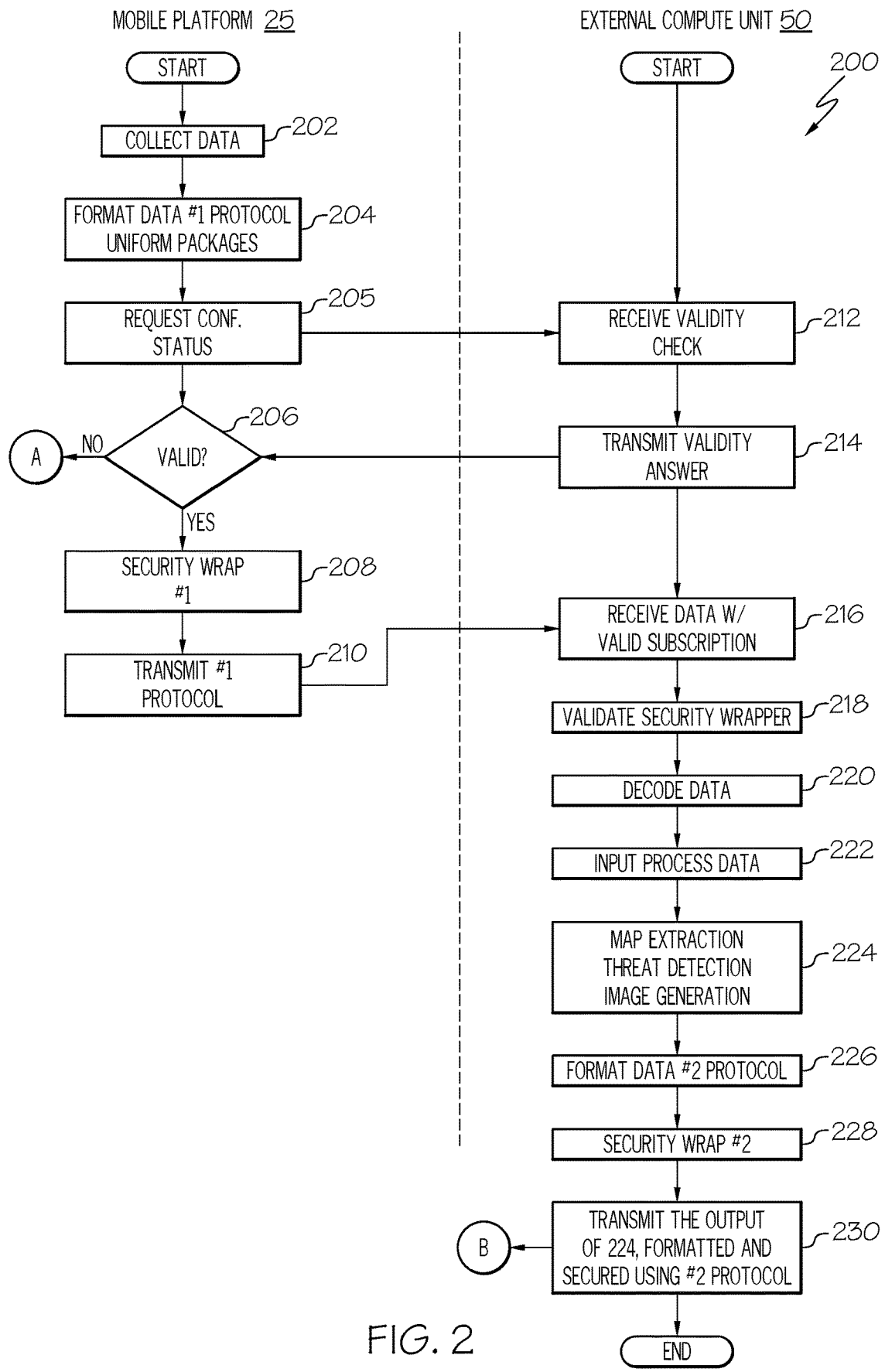
FIGS. 2-3 depict a method for providing a terrain and runway alerting service for a mobile platform using a secured data link, in accordance with an exemplary embodiment.
Figure 3:
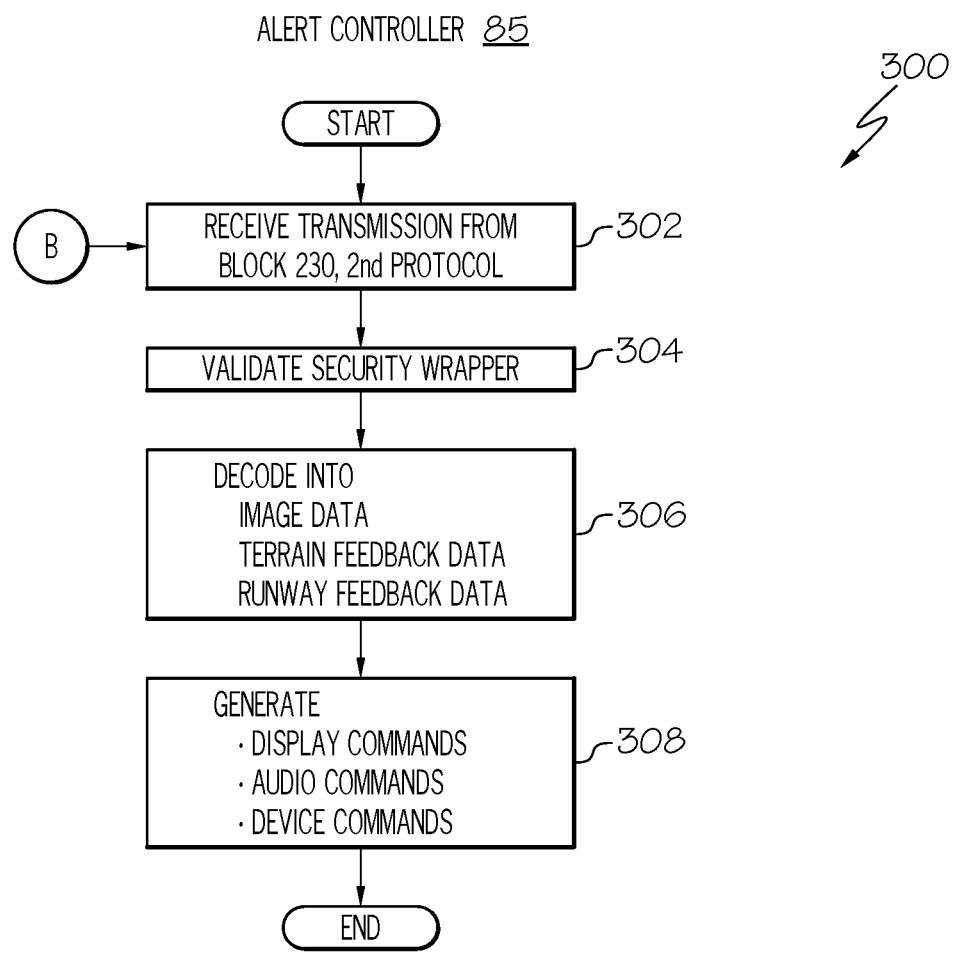

Turning now to FIGS. 2-3, the system 100 described above may be implemented by a processor-executable method for providing terrain and runway feedback for a mobile platform 25. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIGS. 2-3 need not be performed in the illustrated order, and method 200 may be incorporated into a more comprehensive procedure or method having additional functionality not described in detail herein. Moreover, one or more of the tasks shown in FIGS. 2-3 could be omitted from an embodiment of the method 200 as long as the intended overall functionality remains intact.

As may be appreciated, prior to the method 200 starting, the controllers are initialized. When implemented using enhanced computer systems, initialization may comprise uploading or updating the instructions of a program for execution by a respective processor. In various embodiments, initialization also includes identifying or determining a previously prescribed communication protocol and a security protocol for use.

The operations 202-210 are performed by telemetry controller 35. The telemetry controller 35 operations include: At 202, creating a first data package of concurrently collected mobile platform data including state data and sensed avionics status data; at 204, formatting the first data package in accordance with a first communication protocol. Non-limiting examples of the communication protocols include:

TCP/IP based protocols, such as FTP, TFTP; and, ATN/OSI based protocols, such as IP-SNDCF.

In embodiments using the subscription management service, at 206, telemetry controller 35 confirms the mobile platform has a valid subscription service. Telemetry controller 35 may confirm that the mobile platform has a valid subscription service by (i) transmitting, to the external compute unit 50, a request for status that includes an identification of the mobile platform (at 205), and (ii) receiving an affirmative response from the external compute unit 50 (at 206). A valid subscription service may include being registered. In various embodiments, a valid subscription service requires that a service fee has been timely paid. In an embodiment, telemetry controller 35 may inhibit operational performance of the mobile platform 25 if telemetry controller 35 receives a negative response to the request for status, demarked "A" on FIG. 2. In various embodiments, telemetry controller 35 may determine when the subscription service is delinquent (if telemetry controller 35 receives a negative response to the request for status); and generate an alert command indicating that a bill is due from mobile platform 25 when the subscription service is delinquent.

At 208, regardless of whether the subscription management service is employed, the telemetry controller 35 secures the first data package using a security protocol. The security protocol is a means for protecting against unwanted surveillance and tampering. In some embodiments, the security protocol includes a digital signature. In some embodiments, the security protocol includes digital encryption. In some embodiments, the security protocol includes both digital signatures and digital encryption.

At 210, the telemetry controller 35 transmits the secured first data package in accordance with the first communication protocol. It is to be appreciated that the secured first data package constitutes data that is to be processed with the terrain database 132.

As may be appreciated, data packages may be sequentially collected by the telemetry controller 35 over a period of time. When there is a plurality (N) of data packages to be transmitted to the external compute unit 50, the first data package may be referred to as the first data package, or as data package (t=1), and subsequent data packages may be enumerated as data package (t=2) through data package (t=N). In various embodiments, data packages are collected, secured, and transmitted, at equally spaced predetermined intervals of time. In other embodiments, the time intervals for collection, securing, and transmitting data packages are adjusted responsive to an alert priority algorithm.

The operations 212-230 are performed by threat and map controller 45, at the external compute unit 50, on the ground. As mentioned, in various embodiments, prior to accepting a transmitted data package, a validity check may be performed to confirm that the sender mobile platform 25 has a valid subscription. From the perspective of the threat and map controller 45, the validity check includes, receiving a status confirmation request from a mobile platform 25 at 212, the request including a mobile platform identification, and referencing the mobile platform identification in the subscription database 130 to thereby recover at least a binary true (valid) or false (invalid) answer to the mobile platform 25 request. The binary true (valid) or false (invalid) answer to the mobile platform 25 request is transmitted at 214. In various embodiments, the external compute unit 50 may send a balance due message back to the mobile platform 25 when the answer is false.

At 216, a secured data package from a mobile platform 25 is received. For embodiments using the subscription management service, at 216, the secured data package is only accepted/received from a mobile platform 25 with a valid subscription service. As may be appreciated, in various embodiments, the external compute unit 50 may not accept data packages at 216 when the answer is false. At 218, for embodiments using the subscription management service, threat and map controller 45 validates the security protocol used on the secured first data package. Validating the security protocol may include (i) identifying the security wrapper, (ii) approving a digital signature, and (iii) approving a digital encryption. After the security is validated, the method proceeds to 220 to decode the data to reveal the concurrently collected data, i.e., sort the collective data package into its original chunks of sensed state data and chunks of sensed avionics data.

The data from 220 may then be input processed at 222, which, as used herein, refers to feeding it into a virtual model of an aircraft, or appropriate mobile platform model, to subject it to input data validation and filtering. At 224, the output data from 222 is fed into the map extraction module 134, the threat detection module 136 and the image generation module 138, to thereby generate the raw data referred to above as the terrain and runway feedback data that is associated with the mobile platform. The image generation module 138 can be configured to generate "background" image data, "threat" image data, or map data, as is conventionally done. The output from 224 (terrain and runway feedback data) is then formatted into a second data package in accordance with a second communication protocol at 226 and secured with a second security protocol at 228 before the formatted and secured second data package (having therein the terrain and runway feedback data) is transmitted, at 230, in accordance with the second security protocol. In various embodiments, the first security protocol and the second security protocol are the same. In various embodiments, the first communication protocol and the second communication protocol are different.

After the formatted and secured second data package (having therein the terrain and runway feedback data relevant to the mobile platform at its current location and state) is transmitted (at 230), the operations at the external compute unit 50 may end, or may proceed, as indicated by "B," and picked up on FIG. 3, with method 300.

The above exemplary embodiments employ security wrapping with operations 208 and 228. It is contemplated that various embodiments may omit security wrapping operations 208 and 228, thereby transmitting just the respective formatted data packages.

The alert controller 85 performs the operations shown in method 300. The alert controller 85 receives the formatted and secured second data package (having therein the terrain and runway feedback data) at 302. At 304, the alert controller 85 validates the security wrapper, and at 306, the secured second data package is decoded into its underlying raw data (the chunks of image data, terrain feedback data, and runway feedback data). At 308, alert commands are generated, as described above. Alert commands may be for one or more alert devices 95, such as: a display device, a display system, an audio system, a light, a haptic system, or the like. Accordingly, the alert commands may include display commands, audio commands, illuminating commands, and vibrational controls. In addition, the alert controller 85 may generate device commands. It is to be appreciated that the alert commands embody the results of processing the mobile platform data with the terrain database 132; accordingly, wherever the alert controller 85 resides, an operator can view, hear, or otherwise experience the results of the mobile platform data processed with the terrain data.

While the exemplary embodiment of FIGS. 1-3 is described in the context of a controllers embodied as fully functioning enhanced computer systems, those skilled in the art will recognize that the mechanisms of the present disclosure are capable of being distributed as a program product. As may be appreciated, the programs for each of the three respective controllers (telemetry controller 35, threat and map controller 45, and the alert controller 82) may be developed together to cooperate with each other in the various steps, and, in applying security protocols and in utilizing communication protocols. Once developed, the programs may be stored and distributed individually, or together. As a program product, one or more types of non-transitory computer-readable signal bearing media may be used to store and distribute the programs, such as a non-transitory computer readable medium bearing the programs and containing therein additional computer instructions for causing a computer processor to load and execute a respective program. Such a program product may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

Thus, the proposed systems and methods for providing terrain and runway feedback for a mobile platform provide a technologically improved terrain and runway feedback for a mobile platform. As is readily appreciated, the above examples of the system 100 are non-limiting, and many others may be addressed by the controllers (telemetry controller 35, threat and map controller 45, and the alert controller 82).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for providing terrain and runway feedback for a mobile platform not having an on-board terrain database, comprising:
a first controller onboard the mobile platform, the first controller operable to:
create a first data package of concurrently collected mobile platform data including state data including a ground speed and a direction of travel;
format the first data package in accordance with a first communication protocol thereby creating a formatted first data package;
secure the formatted first data package using a security protocol, thereby creating a secured first data package; and
transmit the secured first data package in accordance with the first communication protocol; and
a second controller external to the mobile platform, the second controller operable to:
decode the secured first data package to reveal the concurrently collected mobile platform data;
process the concurrently collected mobile platform data with map extraction and threat detection, thereby generating terrain and runway feedback data that is representative of the mobile platform with the state data, including the ground speed and the direction of travel;
create image data that is representative of the mobile platform with the state data, including the ground speed and the direction of travel by performing image generation on the terrain and runway feedback data;
create a second data package including the image data and the terrain and runway feedback data, formatted in accordance with a second communication protocol;
secure the second data package using the security protocol, thereby creating a secured second data package; and
transmit the secured second data package in accordance with the second communication protocol; and
an alert controller operable to:
receive the secured second data package from the second controller;
validate the security protocol used on the secured second data package;
decode the secured second data package to reveal the image data and the terrain and runway feedback data; and
generate each of: display commands for displaying the image data on an onboard display system, audio commands, and device commands, responsive to decoding the secured second data package.

2. The system of claim 1, wherein the first controller is further operable to create the first data package further including concurrently collected flight data and user input data.

3. The system of claim 2, wherein the security protocol includes digital signing or digital encryption.

4. The system of claim 3, further including: the display system onboard the aircraft, configured to receive the display commands and render images based on the image data, responsive to the display commands.

5. The system of claim 1, wherein the second controller is further operable to:
determine whether a subscription management service of the mobile platform is delinquent; and
generate an alert command indicating that a bill is due when the subscription management service is delinquent.

6. The system of claim 1, wherein the second controller is further operable to:
rasterize a most relevant area of the image data, responsive to determining that the image data contains a map larger and higher-resolution than the onboard display system can accommodate, thereby creating a terrain data patch; and
create the second data package using terrain data patch.

7. The system of claim 1, wherein the first controller and the alert controller are integrated.

8. A method for providing terrain and runway feedback for an aircraft not having a terrain database, comprising:
at a telemetry controller onboard the aircraft:
creating a first data package of concurrently collected aircraft data including state data;
formatting the first data package in accordance with a first communication protocol, thereby creating a formatted first data package;
determining whether the aircraft has a valid subscription management service responsive to activation of a subscription management service;
securing the formatted first data package using a security protocol, thereby creating a secured first data package; and
transmitting the secured first data package in accordance with the first communication protocol; and
at a threat and map controller external to the aircraft:
receiving the secured first data package from the aircraft;
validating the security protocol used on the secured first data package;
decoding the first data package to reveal the concurrently collected aircraft data;
processing the concurrently collected aircraft data with map extraction and threat detection, thereby generating terrain and runway feedback data for the aircraft representative of the state data;
performing image generation on the terrain and runway feedback data, thereby creating image data that represents the aircraft and the state data;
formatting the image data and terrain and runway feedback data in accordance with a second communication protocol to thereby create a second data package;
securing the second data package using the security protocol, thereby creating a secured second data package; and
transmitting the secured second data package in accordance with the second communication protocol; and
at an alert controller:
receiving the secured second data package;
validating the security protocol used on the secured second data package;
decoding the secured second data package to reveal the image data and the terrain and runway feedback data; and
generating display commands for displaying the image data on a cockpit display system onboard the aircraft, responsive to the image data and terrain and runway feedback data.

9. The method of claim 8, wherein the telemetry controller is further operable to create the first data package further including concurrently collected flight data and user input data.

10. The method of claim 9, wherein the alert controller is located on the aircraft or external to the aircraft.

11. The method of claim 10, wherein the security protocol includes digital signing or digital encryption.

12. The method of claim 11, further including: at the cockpit display system, receiving the display commands and rendering images responsive to the display commands.

13. The method of claim 10, wherein the telemetry controller and alert controller are integrated.

14. The method of claim 8, further comprising, at the telemetry controller:
generating an alert indicating that a bill is due when the subscription management service is delinquent.

15. The method of claim 8, further comprising, at the map controller;
rasterizing a most relevant area of the image data, responsive to determining that the image data contains a map larger and higher-resolution than the cockpit display system can accommodate, thereby creating a terrain data patch; and
creating the second data package using the terrain data patch.

16. A system for providing terrain and runway feedback for a mobile platform comprising a display system responsive to display commands and a telemetry controller operable to transmit a secured first data package of concurrently collected mobile platform data for the mobile platform, the mobile platform not having an on-board terrain database, the mobile platform data including state data,
the system comprising;
a threat and map controller external to the mobile platform, the threat and map controller operable to:
receive the secured first data package from the mobile platform;
validate a security protocol used on the secured first data package;
decode the secured first data package to reveal the concurrently collected mobile platform data;
process the concurrently collected mobile platform data with map extraction, threat detection, and image generation, thereby creating image data including terrain and runway feedback data;
format the image data in accordance with a second communication protocol to thereby create a second data package;
secure the second data package using the security protocol, thereby creating a secured second data package; and
transmit the secured second data package in accordance with the second communication protocol; and
an alert controller operable to:
receive the secured second data package from the second controller;
validate the security protocol used on the secured second data package;
decode the second data package to reveal the image data; and
generate and transmit display commands for a cockpit display to display the image data, responsive to decoding the second data package.

17. The system of claim 16, wherein the mobile platform comprises an audio system responsive to audio commands, and the alert controller is further operable to generate and transmit audio commands, responsive to decoding the second data package.

18. The system of claim 17, wherein the security protocol includes digital signing and digital encryption.

19. The system of claim 18, wherein the threat and map controller is further operable to:
determine that a subscription status of the mobile platform is delinquent and
generate an alert command indicating that a bill is due, responsive thereto.

20. The system of claim 19, wherein the alert controller is on-board the mobile platform.

* * * * *